F. S. VAUGHN.
FLUID PRESSURE SYSTEM AND AUTOMATIC GOVERNOR THEREFOR.
APPLICATION FILED JAN. 10, 1907.
1,050,876.
Patented Jan. 21, 1913.
2 SHEETS—SHEET 1.
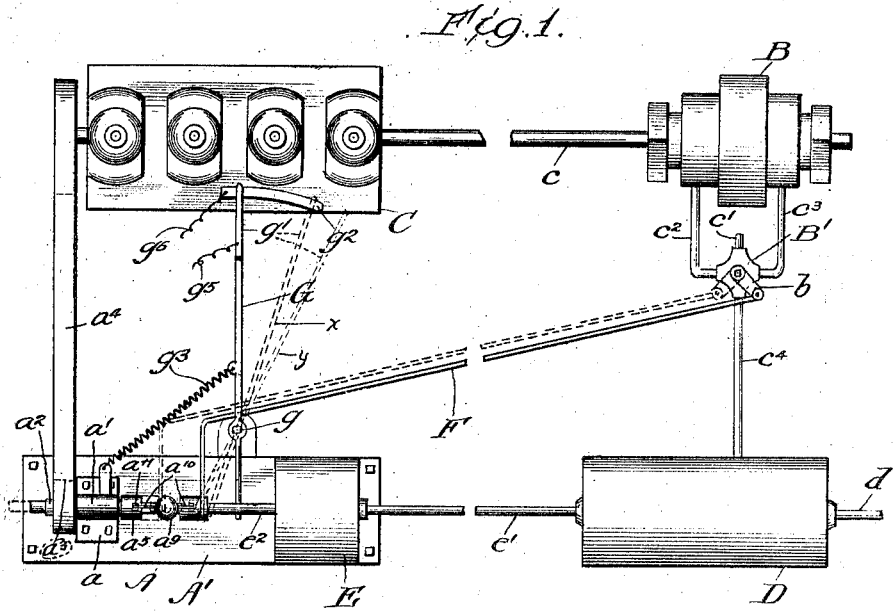
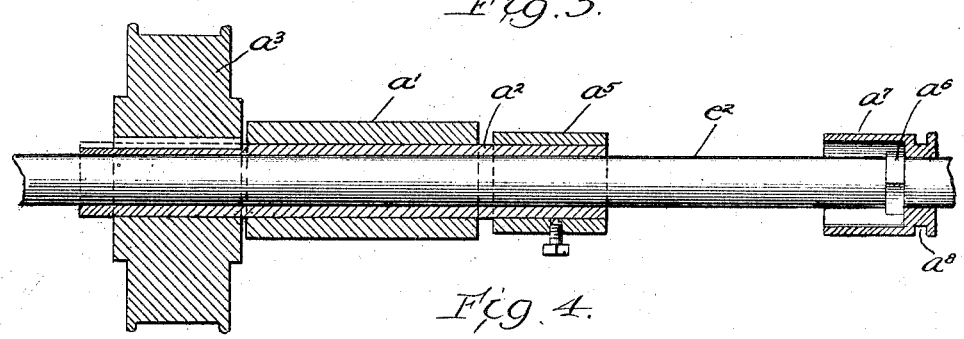
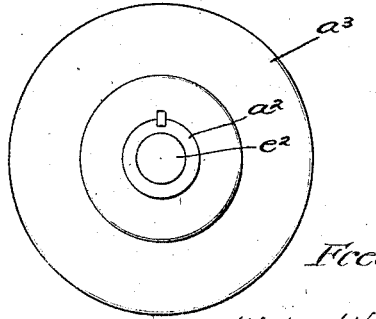
Witnesses
Harry R. White
Ray White
Inventor
Fred S. Vaughn
By W. W. Withenbury Atty.

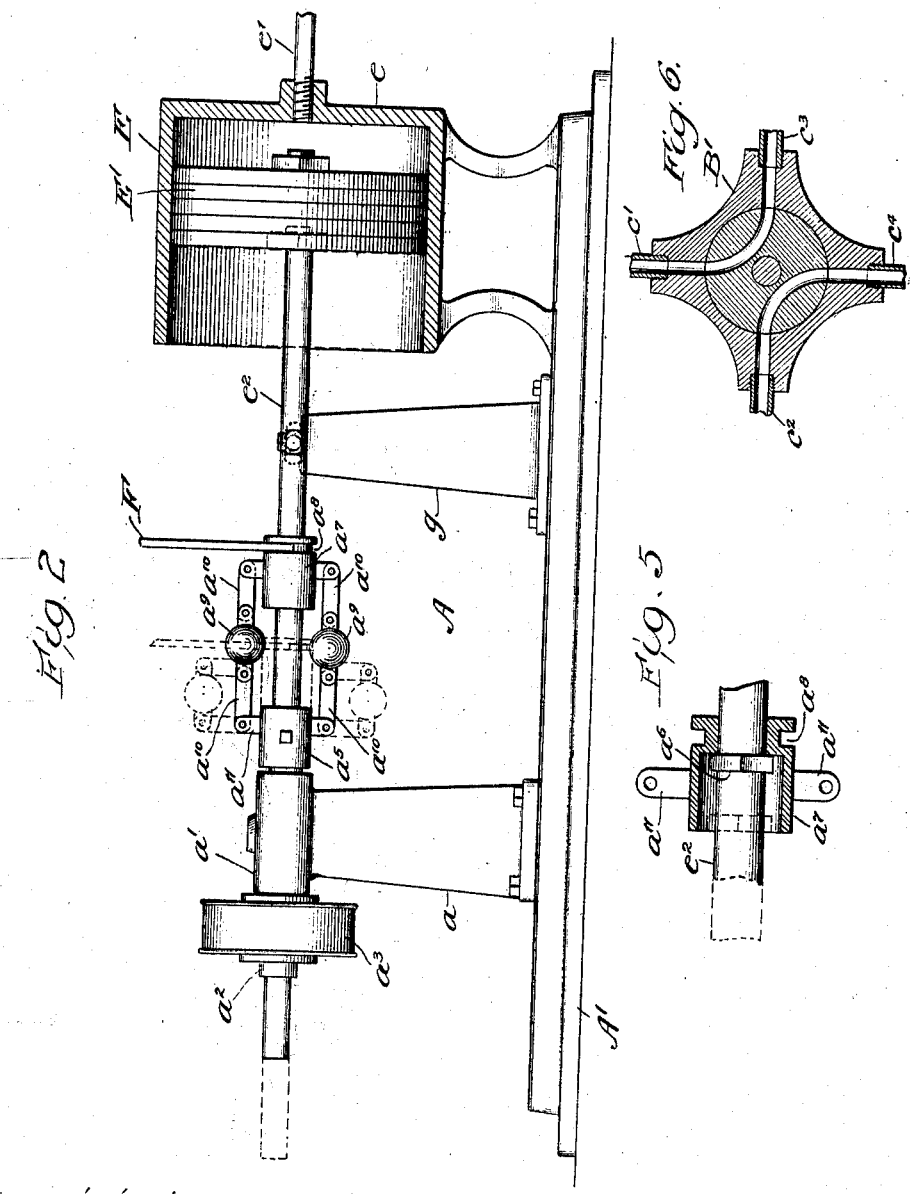

UNITED STATES PATENT OFFICE.

FRED S. VAUGHN, OF CHICAGO, ILLINOIS, ASSIGNOR OF ONE-HALF TO J. ROY BROWN, OF QUINCY, ILLINOIS.

FLUID-PRESSURE SYSTEM AND AUTOMATIC GOVERNOR THEREFOR.

1,050,876.  Specification of Letters Patent.  Patented Jan. 21, 1913.

Application filed January 10, 1907. Serial No. 351,712.

*To all whom it may concern:*

Be it known that I, FRED S. VAUGHN, a citizen of the United States, residing at Chicago, in the county of Cook and State of Illinois, have invented a new and useful Improvement in Fluid-Pressure Systems and Automatic Governors Therefor, of which the following is a complete specification.

This invention relates to fluid pressure systems and automatic governors therefor and more particularly to a pumping or air compressing system provided with an automatic governor especially adapted to regulate, within predetermined limits, the pressure in the system. Heretofore in such pumping or compressing systems in order to keep the amount of the fluid stored, and consequently the pressure, within desired limits, it has usually been necessary to provide a constant attendant for the engine or other prime mover, even though the pump or compressor is adapted to be automatically cut in and out when the pressure reaches certain limits. This of course greatly increases the cost of operation, not only because of the labor required, but also because of the unnecessary operation of the engine when the pump is out of service. Furthermore it has not been possible when using an internal combustion engine as the prime mover in the system, to automatically stop the engine when a predetermined maximum pressure has been reached in the system and to automatically start the same when the pressure has again fallen below normal.

The object of this invention is to provide a pressure system having a governor adapted to automatically cut out the engine or other prime mover when a predetermined maximum pressure is reached in the system and to automatically start the same when the pressure has again fallen below normal, thereby insuring regular operation and efficiency of the system without the constant care of an attendant and without the continuous operation of the engine when not required.

It is a further object of the invention to provide a device which will make it possible to operate the system by means of an internal combustion engine as the prime mover, and for this purpose a reversing valve is provided in the system which, when the engine has been cut out of the service by the increase of pressure and is dead, will be automatically operated causing a reverse flow of the fluid from the storage tank to the compressor or pump which acts to start the engine and thereby obviating the necessity of either continuously running the engine or requiring the constant employment of an attendant to manually start the same if stopped when the maximum pressure is reached.

The invention consists of the matters hereinafter described and more fully pointed out and defined in the appended claims.

In the drawings: Figure 1 is a fragmentary top plan view of a compressing system provided with a governor embodying my invention. Fig. 2 is an enlarged side elevation of the governor and showing its cylinder in section. Fig. 3 is an enlarged, fragmentary, horizontal section of the governor. Fig. 4 is an end elevation of the driving end thereof. Fig. 5 is a fragmentary view of the governor shaft, showing the movable collar in horizontal section and, in dotted lines, the position which said shaft assumes at maximum pressure. Fig. 6 is an enlarged, horizontal section of the reversing valve.

As shown in said drawings: the pressure system may be of any desired kind, but for the purpose of more clearly illustrating its operation it is shown as an air compressing system which is provided with an automatic governor embodying my invention and indicated as a whole by A. Said air compressing system may comprise any suitable kind or construction of pump but as shown it is composed of a rotary compressor or pump B which is connected directly with the shaft $c$ of the internal combustion engine C of any desired construction. A pipe $c'$ opens from the atmosphere into a four way valve B' of any desired construction, and a pipe $c^2$ leads from said valve to the intake end of said compressor. A pipe $c^3$ leads from the outlet end of said compressor to said valve and a pipe $c^4$ leads from said valve to a storage tank D of any desired construction and capacity. The arrangement of said engine, compressor, tank and governor with respect to each other is immaterial and will depend in each instance upon the requirements of the installation.

Referring now more particularly to the construction of the governor, A' indicates the base which may be a casting or any other desired construction and adapted to be rigidly engaged to a solid foundation. Rigidly engaged on said base, near one end thereof, is a bearing standard $a$, having a bearing sleeve $a'$ at its outer end in which is rotatively engaged the tubular shaft $a^2$ which projects from both ends of said sleeve. On the opposite end of said base and rigidly engaged thereto is a pressure cylinder E which is in axial alinement with the sleeve $a'$ and is provided in its end farthest from said sleeve with a head $e$, through which opens the pipe $e'$ leading from the storage tank D. Said cylinder E may be of any desired diameter, dependent upon the pressure to be maintained in the system and may be provided with any movable member against which the pressure acts, but as shown, it is provided with a close fitting piston $E'$, to which is rigidly engaged one end of the piston rod $e^2$, the other end of which is slidably engaged in the tubular shaft $a^2$. Said tubular shaft may be driven by the engine in any preferred manner but as shown, it is provided on its outer end with a belt pulley $a^3$, in alinement with a similar pulley on the engine shaft, and a belt $a^4$ is carried on said pulleys and causes said shaft to rotate with said engine shaft.

Rigidly engaged on the inner end of the shaft $a^2$ is a collar $a^5$, and rigidly engaged on the piston rod $e^2$ a short distance therefrom is a stop collar $a^6$ against which, on the opposite side thereof from the collar $a^5$, abuts the slidable sleeve $a^7$ which, as shown, is provided in its end adjacent the collar $a^5$ with a chamber adapted to receive the collar $a^6$ and which projects over the collar a considerable distance toward the collar $a^5$ as shown more clearly in Figs. 3 and 5. Weights or balls $a^9$ are flexibly connected with the collar $a^5$ and the sleeve $a^7$ by means of links $a^{10}$ which are pivotally connected therewith and with suitable lugs $a^{11}$ on said collar and sleeve. Centrifugal force acts to throw said balls outwardly from the rod $e^2$ when the shaft $a^2$ is rotated and since the collar $a^5$ is stationary on the shaft $a^2$ the rod $e^2$ is moved by said weights through the shaft $a^2$ until the sleeve $a^7$ contacts with the collar $a^5$, thereby drawing the piston outwardly in the cylinder to the position shown in dotted lines in Fig. 2.

A connecting rod F is provided at one end with a yoke $f$ which engages in a groove $a^8$ in the sleeve $a^7$ and at the other end is connected with the lever $b$ of the four way reversing valve B' and acts when said sleeve is moved to operate said valve. When said sleeve is at the limit of its movement nearest the collar $a^5$ as shown in dotted lines in Figs. 1 and 2, the valve is in normal position or that connecting the outlet end of the compressor with the tank and when at the opposite limit, as shown in full lines in said figures, is in reverse position and permits a flow of fluid from the tank to the intake end of said compressor. A switch lever G is pivotally supported intermediate its ends upon a standard $g$ or in any other preferred manner, and one end thereof projects through a suitable slot in the rod $e^2$ causing it to be moved by said rod. The opposite end of said lever is provided with a metallic point $g'$, which is adapted to engage the switch blade or plate $g^2$ which is arc shaped and controls the sparking device of the engine, not shown. A spring $g^3$ is connected at one end to the lever G intermediate its pivotal point and the contact end thereof and at its opposite end to the sleeve $a'$ or any other immovable part and is of sufficient strength to normally hold the piston rod and the slidable collar retracted as shown in full lines in Fig. 1. The contact point $g'$ and blade $g^2$ are connected with said sparking device and with the electric battery therefor, not shown, by wires $g^6$ and $g^5$ respectively.

The operation is as follows: When there is no pressure in the tank D and the engine is at rest, the spring $g^3$ acts to hold the piston rod $e^2$ retracted or at the limit of its movement toward the pressure cylinder, in which position the switch lever G is in electrical contact with the switch blade or plate on the engine and the connecting rod F is holding the controlling valve in reverse position as shown in full lines in Fig. 1. The engine may be started in the ordinary manner and it immediately rotates the tubular shaft $a^2$ at a rapid rate, causing the balls $a^9$ to rotate therewith. The centrifugal force caused by the rapid rotation of said balls acts to throw them outwardly and thereby move the rod $e^2$ longitudinally against the tension of the spring $g^3$ until said balls reach their outer limit of movement. This movement of the rod $e^2$ throws the reversing valve to the position shown in dotted lines in Fig. 1, in which position the fluid flows from the pump to the tank D, and at the same time throws the lever G to the end of the blade or plate $g^2$ as shown in dotted lines $x$ in Fig. 1. The tension of the spring $g^3$ is such that it will not permit the lever to move off the blade or plate $g^2$ until the pressure in the tank D has nearly reached its maximum. When however the pressure acting on the piston $E'$ has become high enough to overcome the tension of the spring, the rod $e^2$ is moved still farther to the position shown in dotted lines in Fig. 5, that is until the collar $a^6$ abuts against the end of the tubular shaft $a^2$ at which time the lever G has been moved out of contact with the plate $g^2$, as shown in dotted lines at $y$ in Fig. 1, thereby breaking the circuit in the wiring system of the engine and causing it to stop. As the pressure is reduced in the tank through the outlet pipe d, which may lead to any device utilizing the fluid, the spring $g^3$ causes a reverse movement of the rod $e^2$, thereby moving the contact lever back onto the plate $g^2$ and turning the controlling valve to reverse position, thus permitting the fluid to flow from the tank through pipes $c^4$ and $c^2$ to the compressor causing it to rotate and start the engine which at once picks up its speed and repeats the operation.

While I have shown the governor as connected in an air compressing system it is obvious that it may be used for many other purposes and that the arrangement of the different parts in the system will depend in each installation upon the necessities of the case.

I claim as my invention:

1. In a device of the class described the combination with a cylinder, of a piston therein, a piston rod secured to said piston and projecting from the end of the cylinder, a centrifugal governor mounted on said rod and adapted to move the rod and piston longitudinally of the cylinder, pressure storage means adapted to deliver pressure to said cylinder and cause further movement of said piston and rod, and means operated from said rod and adapted to control the pressure in said storage means.

2. In a device of the class described the combination with a cylinder, of a piston therein, a centrifugal governor connected with said piston, and adapted to move the piston in one direction, a pressure reservoir adapted to admit pressure to the cylinder, and move the piston beyond the limit of movement of the governor, means operated by the piston and adapted to control the pressure in the reservoir, and means adapted to return the piston to normal position when the pressure in the reservoir falls.

3. In a device of the class described the combination with a cylinder of a movable member therein, mechanically operated means adapted to move said member longitudinally of the cylinder, a pressure reservoir, means adapted to supply pressure thereto, means adapted to admit pressure from said reservoir into said cylinder and cause further movement of said member, a controlling valve for said reservoir and means thereon connected with said member adapted to operate the valve and control the pressure supply means.

4. In a device of the class described the combination with a reservoir of means for storing fluid therein under pressure, a motor adapted to operate said means, a valve adapted to control the fluid in said reservoir, pressure operated means adapted to stop said motor when a predetermined pressure is reached in said reservoir, means adapted to reverse the valve when the pressure falls and start the motor and automatic means adapted to restore said valve to normal position.

5. In a device of the class described the combination with a rotative tubular shaft of a piston rod slidably engaged therein, centrifugally operating means connecting said rod and shaft and adapted to move one through the other, a cylinder and a piston therein rigidly connected with the end of said rod.

6. In a device of the class described the combination with an internal combustion engine of a tubular shaft rotated thereby, a rod slidably engaged in said tubular shaft, means for moving said rod longitudinally through said tubular shaft, means on said rod adapted to stop the engine and means acting automatically to start the same.

7. In a device of the class described the combination with a pressure cylinder of means for supplying pressure thereto, a piston in said cylinder, a rotary tubular shaft, a piston rod rigidly engaged on said piston and extending through said tubular shaft, centrifugally operated means connecting said rod and shaft and adapted when the tubular shaft is rotated to move the rod longitudinally thereof and a reversing valve operatively connected with said rod.

8. In a device of the class described the combination with an engine of a pump driven thereby, a storage tank, a pipe connecting said pump with said tank, a four way valve therein, a cylinder in open communication with said tank, a piston therein, a piston rod connected with said piston, a shaft adapted to be rotated by said engine, centrifugally operated means connecting said rod and shaft and adapted to move the piston rod longitudinally, a rod connecting the same and said valve and a switch operated by the movement of said piston rod.

9. In a device of the class described the combination with a tubular, rotative shaft, of a piston rod slidably engaged therein, a cylinder, a piston therein connected with said piston rod, means for supplying fluid pressure to said cylinder, a four way valve therein, means connecting said piston rod with said valve, centrifugally operated means adapted when said tubular shaft is rotated to hold the valve in one position, and a switch operated by the movement of said piston rod.

10. In a device of the class described the combination with a tank of means for supplying fluid thereto, an internal combustion engine adapted to operate said means and a governor engine adapted to automatically stop said engine at a predetermined pressure and to create a flow from the tank to said means and start the engine when the pressure has fallen below normal.

11. In a device of the class described the combination with a fluid pumping and storing device, of an internal combustion engine adapted to operate the same, a shaft adapted to be rotated by said engine, a longitudinally movable rod, a cylinder in open communication with said pumping and storing device, means therein adapted to operate said rod, a valve in said pumping and storing device, means actuated by the movement of said rod adapted to operate said valve and means operated by said rod adapted to cut the engine into and out of service dependent upon the position of said valve.

12. In a device of the class described the combination with an engine of a pump operatively connected therewith, a storage tank in communication with said pump and automatic means operated by the pressure in said tank and adapted to operate the pump and start the engine.

13. In a device of the class described the combination with an engine of a pump connected therewith and adapted to be driven thereby and means adapted to store up pressure and automatically operate the pump when the engine is at rest and start the engine.

14. In a device of the class described the combination with an engine of a pump adapted to be driven thereby, a storage tank connected with said pump and pressure operated means adapted to automatically deliver fluid from the tank to the pump and start the engine.

15. In a device of the class described the combination with an engine of a pump driven thereby, a storage tank in communication with said pump, and automatic means adapted to stop the engine when a predetermined pressure is reached in the tank and to operate the pump and start the engine when the pressure falls.

16. In a device of the class described the combination with an engine of a pump driven thereby, a storage tank connected with said pump and pressure operated means adapting said pump to automatically start the engine.

17. In a device of the class described the combination with an engine of a pump adapted to be driven thereby, a storage tank, a pipe connecting the pump with said tank, a reversing valve in said pipe and pressure operated means connected with said valve and adapted to operate the pump and start the engine.

18. In a device of the class described the combination with an engine of a pump operatively connected therewith, a storage tank, a pipe connecting said pump with said tank, a controlling valve therein, a cylinder, a movable member therein, means adapted to admit pressure from the tank into said cylinder, means acting against the pressure in said cylinder and adapted to reverse said valve and cause a flow from the tank to the pump when the pressure falls below normal and means for automatically restoring said valve.

In testimony whereof I have hereunto subscribed my name in the presence of two witnesses.

FRED S. VAUGHN.

Witnesses:
W. W. WITHENBURY,
MATIE WITHENBURY.